United States Patent
Crum

(10) Patent No.: US 9,132,618 B2
(45) Date of Patent: Sep. 15, 2015

(54) COATING OF ACRYLIC ADHESIVE LABELS

(71) Applicant: Ward Kraft, Inc., Fort Scott, KS (US)

(72) Inventor: Jesse D. Crum, Fort Scott, KS (US)

(73) Assignee: Ward Kraft, Inc., Fort Scott, KS (US)

(*) Notice: Subject to any disclaimer, the term of this patent is extended or adjusted under 35 U.S.C. 154(b) by 500 days.

(21) Appl. No.: 13/650,078

(22) Filed: Oct. 11, 2012

(65) Prior Publication Data

US 2013/0087281 A1    Apr. 11, 2013

Related U.S. Application Data

(60) Provisional application No. 61/545,844, filed on Oct. 11, 2011.

(51) Int. Cl.

| | |
|---|---|
| *B29C 65/00* | (2006.01) |
| *B32B 37/00* | (2006.01) |
| *B32B 38/14* | (2006.01) |
| *B65C 9/25* | (2006.01) |
| *C09J 5/00* | (2006.01) |
| *B32B 37/12* | (2006.01) |
| *B41F 5/24* | (2006.01) |
| *B29C 65/48* | (2006.01) |
| *B29C 65/52* | (2006.01) |
| *B32B 37/20* | (2006.01) |

(52) U.S. Cl.
CPC ............... *B32B 37/1284* (2013.01); *B41F 5/24* (2013.01); *B29C 65/48* (2013.01); *B29C 65/52* (2013.01); *B32B 37/20* (2013.01); *B32B 2519/00* (2013.01)

(58) Field of Classification Search
CPC ...... B29C 65/00; B29C 65/48; B29C 65/481; B29C 65/4825; B29C 65/52; B29C 65/526; B29C 65/78; B29C 65/7858; B29C 65/7888; B29C 65/7894; B29C 66/00; B29C 66/70; B29C 66/71; B29C 66/712; B29C 33/68; C09J 2483/005; B05C 1/00; B05C 1/04; B05C 1/08; B05C 1/0813; B05C 1/0826; B05C 1/083; B05C 1/0834; B05D 1/00; B05D 1/28; B05D 5/10; B05D 2252/02; B32B 37/00; B32B 37/12; B32B 37/1284; B32B 37/14; B32B 37/24; B32B 2037/243
USPC .......... 156/60, 230, 231, 234, 235, 236, 238, 156/242, 244.11, 246, 247, 277, 278, 289, 156/306.3, 324, 349, 384, 390, 497, 500, 156/387, 538, 539, 543, 547, 549, 550, 578, 156/580, 332; 118/58, 68, 200, 256, 258, 118/209, 244, 248, 249, 261, 262
See application file for complete search history.

(56) References Cited

U.S. PATENT DOCUMENTS

| | | | |
|---|---|---|---|
| 4,837,088 A | 6/1989 | Freedman |
| 5,676,785 A | 10/1997 | Samonides |
| 6,030,482 A | 2/2000 | Osaka |
| 6,153,279 A | 11/2000 | Charley |

(Continued)

*Primary Examiner* — Philip Tucker
*Assistant Examiner* — Brian R Slawski
(74) *Attorney, Agent, or Firm* — Lathrop & Gage LLP

(57) ABSTRACT

In an indirect process, acrylic adhesive is coated on a silicone liner. A soft rubber roller is employed between a reverse anilox cylinder and an anvil cylinder in a flexo print station to reduce shear hardening in the coating process and prevent or reduce shear hardening on the print rollers. Once the coated silicone liner passes the rollers, air knives are used to speed up the drying of the adhesive on the silicone liner before the coated liner is laminated to a face stock.

7 Claims, 1 Drawing Sheet

(56) References Cited

U.S. PATENT DOCUMENTS

| | | |
|---|---|---|
| 6,206,071 B1 | 3/2001 | Majkrzak et al. |
| 6,379,488 B1 | 4/2002 | Roth |
| 6,626,464 B1 | 9/2003 | Flaherty et al. |
| 6,921,453 B2 | 7/2005 | Dronzek, Jr. et al. |
| 7,556,708 B2 | 7/2009 | Phillips et al. |
| 7,575,649 B2 | 8/2009 | Arippol |

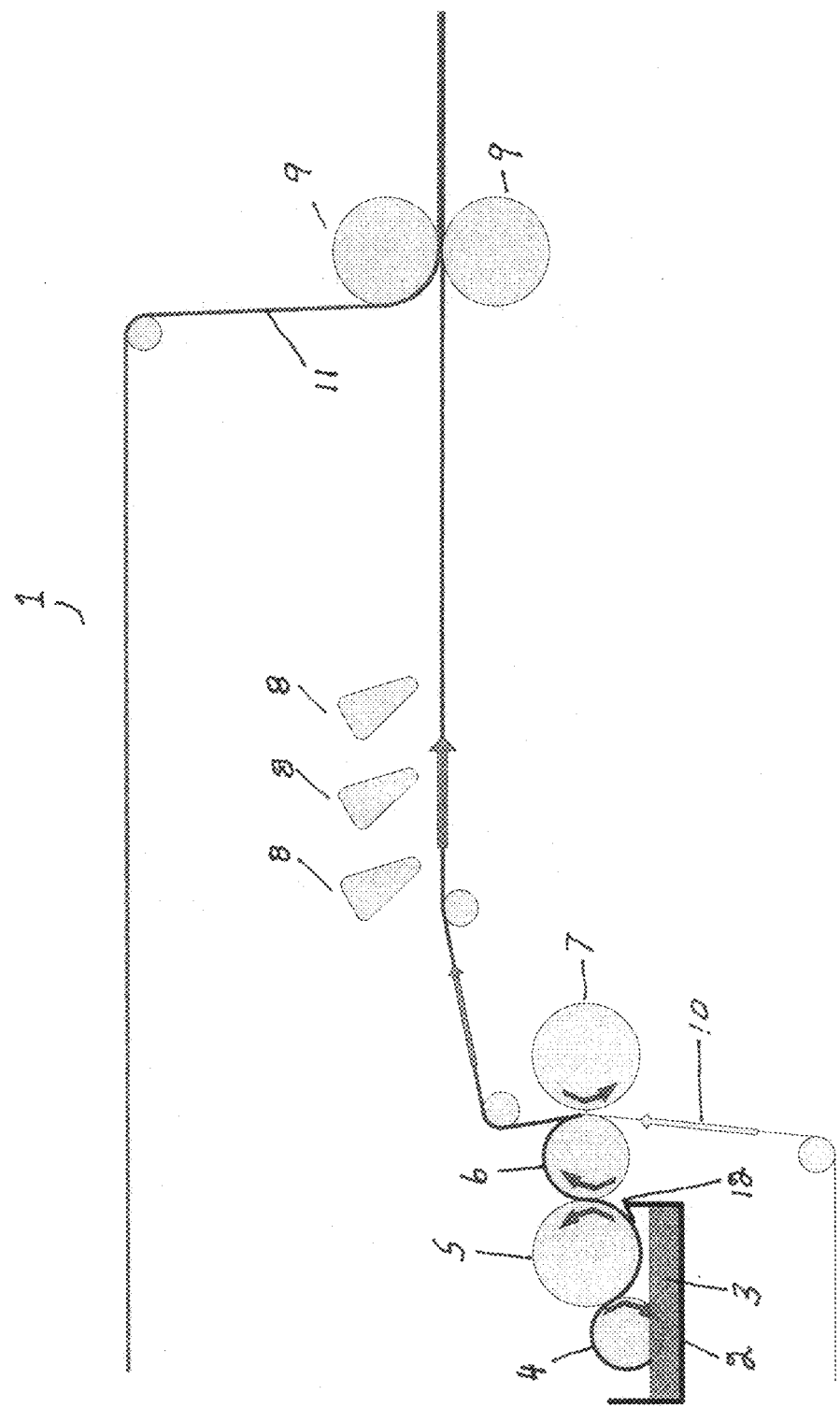

COATING OF ACRYLIC ADHESIVE LABELS

RELATED APPLICATIONS

This application claims priority to U.S. Provisional Application Ser. No. 61/545,844 filed Oct. 11, 2011, the disclosure of which is incorporated herein by reference in its entirety.

FIELD OF INVENTION

The field of the invention is the coating of acrylic adhesive labels.

BACKGROUND

There is more than one method of coating acrylic adhesive on labels. Two common methods are direct coating and indirect or transfer coating.

Direct coating is the process of placing acrylic adhesive on a back side of a face stock before the face stock is laminated to a liner. One problem with direct coating is that a certain amount of the acrylic adhesive is absorbed into the face stock. Thus, it is frequently necessary to apply extra acrylic coating to the face stock so that, when the acrylic adhesive dries, a sufficient amount of acrylic coating remains on the face stock to provide an acceptable tack level—i.e., to allow the label to be properly laminated or stuck to the liner. The use of extra adhesive adds to the cost of the process. Thus, it is desirable to place the acrylic adhesive on the silicone liner so as to reduce the amount of adhesive needed in the coating process.

Indirect coating or transfer coating is the process of coating the adhesive onto a silicone liner and then laminating the face stock onto the adhesive coated silicone liner when the adhesive is almost dry. The acrylic adhesive will then transfer to the face stock more easily, because the adhesion of the acrylic adhesive to the face stock is greater or stronger than the adhesion of the acrylic adhesive to the liner. One of the problems with indirect coating is that silicone does not have a high enough surface tension (dyne level) to allow the adhesive to properly adhere to the silicone, making it extremely difficult to use a forward coating process. As a result, the preferred coating methods are mire rod coating or reverse roll coating from a gravure cylinder or three or more reverse rollers. However, in these processes, it is quite difficult to control the coating thickness when using reverse rollers or three-roll systems, and the reverse gravure method generates work or shear hardening issues, because the adhesive tends to harden or separate prematurely in the roller cells, causing the coating to stay in the print station instead of transferring to the silicone liner.

It is, thus, desirable to provide an indirect or transfer coating process of coating adhesive onto a silicone liner that eliminates or reduces shear hardening of the acrylic adhesive.

SUMMARY OF INVENTION

In an indirect process, acrylic adhesive is coated on a silicone liner. A soft rubber roller is employed between a reverse anilox cylinder and an anvil cylinder in a flexo print station to reduce shear hardening in the coating process and prevent or reduce shear hardening on the print rollers. Once the coated silicone liner passes the rollers, air knives are used to speed up the drying of the adhesive on the silicone liner before the coated liner is laminated to a face stock.

BRIEF DESCRIPTION OF THE DRAWINGS

FIG. 1 is schematic drawing of a design flexo print station in reverse showing the invention.

DETAILED DESCRIPTION

FIG. 1 shows a flexographic printing station 1 comprising a reservoir 2 for acrylic adhesive 3, a meter roller 4, a reverse anilox roller 5, a soft rubber roller 6, an anvil cylinder 7, air knives 8, and laminating rollers 9, where the silicone liner 10 is bonded to the face stock 11.

The silicone liner 10 advances through the station 1 in the direction of the arrow shown in FIG. 1. The meter roller 4, rotating in the direction shown by the arrow on the meter roller 4 in FIG. 1, is coated with acrylic adhesive 3 and transfers the adhesive 3 to the reverse anilox roller 5, which rotates in the direction shown in the arrow in the anilox roller 5 in FIG. 1. The anilox roller 5, in turn, transfers the adhesive 3 onto a soft rubber roller 6, which is rotating in the direction shown by the arrow on the soft rubber roller 6 in FIG. 1.

The silicone liner 10 advances between the soft rubber roller 6 and the anvil cylinder 7 such that the acrylic adhesive 3 is coated on the silicone liner 10. The silicone liner 10 then advances through station 1 and is dried by air knives 8, after which the liner 10 passes between the laminating rollers 9, where it is bonded to the face stock 11.

Since shear can age the adhesive 3 before it is used up on the desired substrate, it has been found that the soft rubber roller 6, which is a neutralizing cylinder between the silicone liner 10 and the anilox roller 5, will control shear and send a partially hard liquid adhesive 3 to the silicone liner 10 without drawing back into drops. As a result a smoother coating of adhesive is coated on the liner 10.

A doctor blade 12 would be the first shear point on the anilox roller 5; however if the coating from the anilox roller 5 is immediately transferred from the anilox roller 5 to the soft rubber roller 6, the coating will transfer rather easily, because the soft rubber roller 5 has a relatively high surface energy (dyne level).

Another point of shear is the contact between the silicone liner 10 and the and the soft rubber intermediate roller 6; however, since the soft rubber roller 6 is rotating in the opposite direction of the advancement of the liner 10, the liner 10 will clean off the roller 6 in a manner similar to a wiping motion.

Once the silicone liner 10 passes the contact between the soft rubber intermediate roller 6 and the anvil cylinder 7, the acrylic adhesive 3 has been transferred to the liner 10 and begins hardening. Since the liner 10 has passed the rubber roller 6 and anvil cylinder 7, the adhesive 3 will not harden on the these rollers and damage them or create uneven transfer of the adhesive 3.

After the adhesive 3 is transferred to the silicone liner 10, it is desirable to speed up the drying of the adhesive 3. The air knives 8 provide high volume air to the adhesive 3 on the liner 10 and speed up the drying of the adhesive 3. The faster the liner 10 moves in the station 1, the greater the volume of air needed to speed the drying process.

After the adhesive 3 is about 90% dry it is over laminated with a face stock 11, both the face stock 11 and the coated silicone liner 10 are nipped together to produce a pressure sensitive label material.

Prior art processes coat the liner 10 in an offline process, producing a roll of material which would be advanced to a converting press for printing and die cutting. However, with the process described above, these actions can be done inline, providing signification savings in labor and material costs and providing a more efficient way to finish the labels for shipping.

In an alternative embodiment, a pattern roller (not shown) may be used instead of the soft rubber intermediate roller 6. In this manner, various patterns can be achieved even though the rotation is reversed to allow for the wipe-on effect, as long as the reverse rotation distortion is considered when making the pattern roller.

The invention claimed is:

1. A process for coating adhesive to a silicone liner in the production of pressure sensitive labels comprising:
(a) transferring adhesive from a reverse anilox roller to a first roller;
(b) passing a silicone liner between the first roller and an anvil cylinder to place the adhesive on the silicone liner;
(c) drying the adhesive with air knives; and
(d) laminating the coated silicone liner to a face stock;
wherein the first roller is at least one of a soft rubber roller and a pattern roller.

2. The process of claim 1 wherein the first roller is the soft rubber roller.

3. The process of claim 2 wherein the adhesive is an acrylic adhesive.

4. The process of claim 3, wherein a meter roller is used to transfer the acrylic adhesive from a reservoir to the reverse anilox roller.

5. The process of claim 4, wherein:
the meter roller and the soft rubber roller rotate in a first direction; and
the reverse anilox roller and the anvil cylinder rotate in a second direction opposing the first direction.

6. The process of claim 3, wherein the acrylic adhesive is about ninety percent dry before the liner is laminated to the face stock.

7. The process of claim 6, wherein the coated silicone liner is laminated to the face stock by a pair of laminating rollers.

* * * * *